United States Patent [19]

Shimano

[11] Patent Number: 4,566,041
[45] Date of Patent: Jan. 21, 1986

[54] PICTURE SIGNAL DETECTOR AND DETECTION METHOD FOR IMAGE REPRODUCING SYSTEM

[75] Inventor: Noriyuki Shimano, Uji, Japan

[73] Assignee: Dainippon Screen Mfg. Co., Ltd., Kyoto, Japan

[21] Appl. No.: 512,779

[22] Filed: Jul. 8, 1983

[30] Foreign Application Priority Data

Oct. 21, 1982 [JP] Japan .............................. 57-15961[U]

[51] Int. Cl.$^4$ ........................ H04N 1/02; H04N 1/10; H04N 3/12; H04N 1/04
[52] U.S. Cl. .................................. 358/284; 358/212; 358/285; 358/287; 358/293; 357/24
[58] Field of Search ............... 358/294, 287, 288, 293, 358/285, 280, 212, 213, 284; 257/24 LR

[56] References Cited

U.S. PATENT DOCUMENTS

| | | | |
|---|---|---|---|
| 4,399,469 | 8/1983 | Lew | 358/280 |
| 4,403,258 | 9/1983 | Balzan et al. | 358/284 |
| 4,479,149 | 10/1984 | Yoshioka et al. | 358/284 |

FOREIGN PATENT DOCUMENTS

| | | |
|---|---|---|
| 075858 | 9/1982 | European Pat. Off. . |
| 1297879 | 7/1971 | United Kingdom . |
| 1427239 | 3/1973 | United Kingdom . |
| 2030026 | 8/1979 | United Kingdom . |

Primary Examiner—Howard W. Britton
Assistant Examiner—John K. Peng
Attorney, Agent, or Firm—Lowe King Price & Becker

[57] ABSTRACT

A sensory area of an imaging face composed of multiple photo-diodes arranged in a matrix is determined, without using a conventional slit, by selectively turning some of said photo-diodes on. The size of the sensory area is a function of the number of continuous photo-diodes that are turned on.

9 Claims, 4 Drawing Figures

PICTURE SIGNAL DETECTOR AND DETECTION METHOD FOR IMAGE REPRODUCING SYSTEM

FIELD OF THE INVENTION

This invention relates generally to an image signal detection device and method, and particularly to such a a device and method for an image reproducing system, such as facsimile and monochrome or color scanners to detect an original picture image using a signal obtained by scanning the original picture.

BACKGROUND OF THE INVENTION

The function of an image signal detection device, i.e., an input head of an image reproducing system, is very important since image signal detection has a great influence on image processing and on the quality of the output image. A conventional scanner, as shown in FIG. 1, exposes light on an original picture drum A with a beam producer for obtaining a reflected beam 2 or with a beam producer for obtaining a transmitted beam 2′. An enlarged image of the original picture is obtained by picking up the reflected or transmitted beam via a pickup lens 3, and detecting the enlarged image through a slit 4 with a detection device 5 such as a photo-multiplier or photo-diodes. Rotation of the original picture 1 fixed on the drum means A below the pickup lens 3 establishes scanning along a main scanning line and this routine is carried out for subsequent main scanning lines. Between successive main scanning lines for a sub-scanning length defined as the distance perpendicular to the main scanning direction; the sub-scanning length is established in accordance with the magnification rate of the pickup lens 3 and gap width of the slit 4. This sub-scanning length should be controllable since the screen ruling number may be changed or the magnification in sub-scanning direction between the input side (fixed) and the output side (variable) may be changed. To put this method into practice, a conventional scanner employs multiple slits which have several properly selected gap widths or a slit having a gap width which can be mechanically gradually or step-wise varied.

However, the former method requires multiple slits which have several gap widths, while the latter method requires a complicated mechanical system.

SUMMARY OF THE INVENTION

An object of this invention is to provide an improved method of and device for image signal detection in facsimile and other applications, wherein the above mentioned deficiencies and inconveniences are avoided. Another object is to provide such a method and device wherein no mechanical slit or multiple slits are required.

The invention employs multiple photo-diodes arranged in a matrix on an imaging face of a scanner head for forming a sensory face of an image reproducing system. The photo-diodes are selectively turned on at the scale of pixels to vary the sensitive area rapidly.

The above and other objects and features of this invention can be appreciated more fully from the following detailed description when read with reference to the accompanying drawings.

DETAILED DESCRIPTION OF A PREFERRED EMBODIMENT

Figure 1:
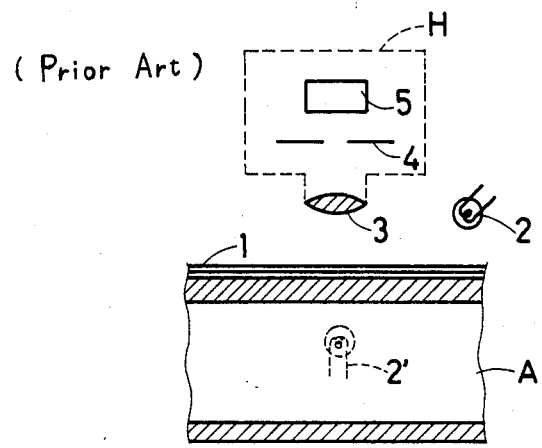
FIG. 1 is a view of a conventional scanner pickup.
Figure 2:
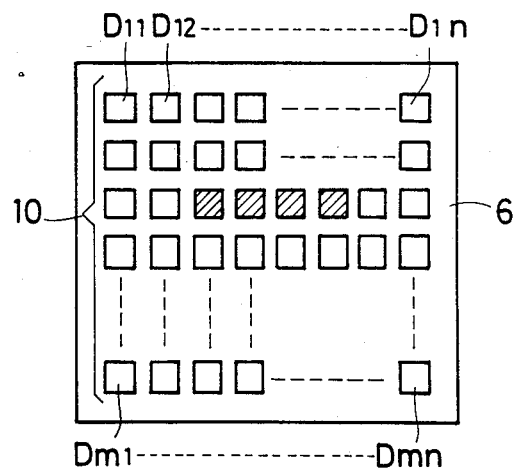
FIG. 2 is an imaging face of a detector in accordance with this invention.
Figure 3:
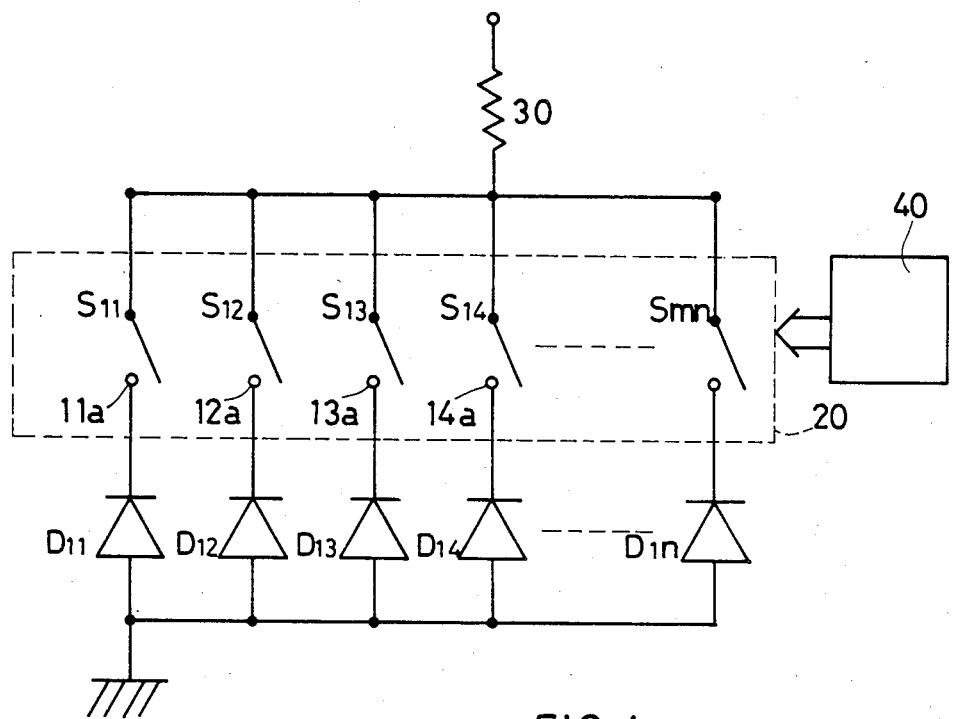
FIG. 3 is a circuit for controlling the detector shown in FIG. 2.

Referring to FIG. 2, $D_{11}$, $D_{12}$, ... $D_{mn}$ are m×n electrically insulated photo-diodes arranged in a matrix on a wafer of semiconductor material, manufactured by standard semiconductor dice processing. As shown in FIG. 3, electrodes $11_a$, $12_a$, $13_a$ ... $1n_a$ on the sensitive side of these photo-diodes are wired to a terminal which is capable of being connected to the electrodes of a substrate (grounded side) via a switching means 20 ($S_{11}$, $S_{12}$, ... $S_{mn}$), a signal detecting resistor 30 being common to all the photo-diodes. The switching means 20 ($S_{11}$, $S_{12}$, ... $S_{mn}$) can be realized either with transistors controlled by an external controller 40, or with manually controlled switches.

Figure 4:
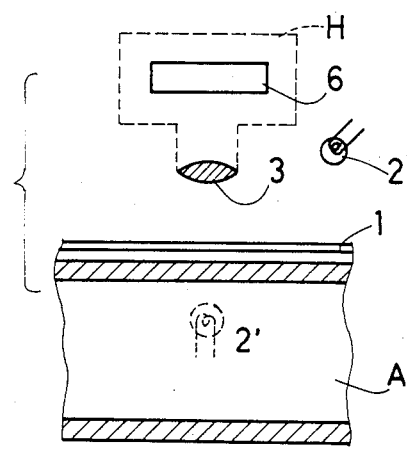
FIG. 4 is an embodiment of a detector applied to the picture signal pickup of a scanner in accordance with this invention.

Detection circuit 6, FIG. 4, is positioned behind the pickup lens 3 in place of a conventional detector 5 as a sensory face. Thus, when an information beam is received by the detection circuit, several continuous photo-diodes controlled to be sensitive is equivalent to the setting of a gap width of the slit 4 in conventional methods. In other words, when four photo-diodes, for example, shown as hatched squares in FIG. 2 are turned on by the corresponding switches, an area occupied by the photo-diodes is a sensory area, controlled continuously by an electrical switching means.

As mentioned above, this device employs multiple photo-diodes arranged in a matrix, some of which are selectively turned on for scanning an original picture in an image reproducing process. This leads to greater convenience in setting a predetermined sensory area.

The aforesaid explanation is based on detecting a picture signal. This device also, however, can be used for detecting an unsharp signal to emphasize details of a reproduced image. That is, by using photo-diodes to detect a picture signal (sharp signal), an unsharp signal can be obtained as an averaged signal from said surrounding photo-diodes.

In addition, this device can also be used for detecting picture signals corresponding to several scanning lines at the same time, or for detecting a picture signal corresponding to a portion of one scanning line.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A detector for a picture signal of an image reproducing system which records the reproduced image of an original picture by using a picture signal, comprising a sensory face composed of multiple photo-diodes arranged in a matrix on an imaging face, and means for selectively enabling current to flow through only some of said photo-diodes to establish a predetermined sensory area.

2. The detector of claim 1, wherein said photo-diodes are formed in a matrix on a common semiconductor substrate.

3. The detector of claim 1 further including a load impedance, the selective enabling means including switch means for connecting only the selected photo-diodes in circuit with the load impedance.

4. The detector of claim 1 further comprising a rotary drum adapted to hold a source of the image to be reproduced, means for illuminating the image source, and a lens positioned between the drum and the matrix of photo-diodes for enlarging the illuminated image source so the enlarged image source is incident on the photo-diodes of the matrix.

5. A method of recording a reproduced image of an original picture using a matrix of photo-diodes on an imaging face, comprising the steps of exposing the imaging face to a scanning information beam related to the original picture and selectively enabling current to flow thorugh only some of said photo-diodes so that only some photo-diodes are effectively responsive to the beam, thereby establishing a predetermined sensory area of the face.

6. The method of claim 5 wherein said only some photo-diodes are continuous in a line of the matrix.

7. The method of claim 6 wherein only some of the photo-diodes in said line are enabled.

8. An image signal detector in facsimile and other related devices comprising means for establishing main scanning lines of an image to be transduced by the detector, the distance perpendicular to the main scanning lines being defined as a sub-scanning length, means for controlling the sub-scanning length, said means for controlling including: a matrix of sensors responsive to radiation of the image positioned so the image is simultaneously incident on all of the sensors, the sensors being positioned along x and y directions, a load impedance, and switch means for selectively connecting only some of said sensors in circuit with said load impedance so current flows to the load via the illuminated sensors that are connected by the switch means to the load, the sensors connected in circuit with said load impedance being continuous in a line of the sensors along one of said directions of the matrix.

9. The detector of claim 8, wherein the means for establishing includes a rotary drum adapted to hold a source of the image, means for illustrating the image source, and a lens positioned between the drum and the matrix of sensors for enlarging the illuminated image source so the enlarged image source is incident on the sensors of the matrix.

* * * * *